US012662163B2

(12) United States Patent
Malm et al.

(10) Patent No.: US 12,662,163 B2
(45) Date of Patent: Jun. 23, 2026

(54) DEFINITION OF BOUNDARY FOR A ROBOTIC WORK TOOL

(71) Applicant: HUSQVARNA AB, Huskvarna (SE)

(72) Inventors: Jakob Malm, Huskvarna (SE); Herman Jonsson, Huskvarna (SE); Stefan Granno, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 47 days.

(21) Appl. No.: 18/540,185

(22) Filed: Dec. 14, 2023

(65) Prior Publication Data

US 2024/0199080 A1      Jun. 20, 2024

(30) Foreign Application Priority Data

Dec. 16, 2022     (SE) .................................... 2251474-9

(51) Int. Cl.
B60W 60/00          (2020.01)
(52) U.S. Cl.
CPC ..... B60W 60/0025 (2020.02); *B60W 2300/15* (2013.01); *B60W 2754/10* (2020.02)
(58) Field of Classification Search
CPC ......... B60W 60/0025; B60W 2300/15; B60W 2754/10; G05D 1/6482; G05D 1/2246
See application file for complete search history.

(56) References Cited

U.S. PATENT DOCUMENTS

| | | | | | |
|---|---|---|---|---|---|
| 10,497,263 | B2 * | 12/2019 | Oh | ......................... | B60W 30/12 |
| 10,598,793 | B2 * | 3/2020 | Öhrlund | ............... | G05D 1/0219 |
| 10,845,804 | B2 * | 11/2020 | Holgersson | .......... | G05D 1/0265 |
| 10,928,833 | B2 * | 2/2021 | Reigo | ...................... | G01S 19/14 |
| 11,014,237 | B2 * | 5/2021 | Clucas | ................... | B25J 9/1692 |
| 11,140,819 | B2 * | 10/2021 | Chen | ..................... | G05D 1/0088 |
| 11,172,605 | B2 * | 11/2021 | Hahn | .................... | A01D 34/008 |
| 11,172,608 | B2 * | 11/2021 | Hahn | .................... | G05D 1/0225 |
| 11,334,082 | B2 * | 5/2022 | Frick | ................... | G01C 21/3867 |
| 11,778,949 | B2 * | 10/2023 | Fillep | ..................... | A01D 34/66 56/16.4 R |
| 11,937,539 | B2 * | 3/2024 | Kulkarni | ................ | G06V 20/58 |
| 12,185,663 | B2 * | 1/2025 | Juel | ...................... | G05D 1/0278 |
| 2016/0231746 | A1 * | 8/2016 | Hazelton | .............. | G05D 1/0274 |

(Continued)

FOREIGN PATENT DOCUMENTS

| | | | |
|---|---|---|---|
| EP | 3876063 | A1 | 9/2021 |
| SE | 2050391 | A1 | 10/2021 |

(Continued)

OTHER PUBLICATIONS

Swedish Office Action and Search Report for Swedish Application No. 2251474-9, Mailed on Jun. 21, 2023.

*Primary Examiner* — Redhwan K Mawari
(74) *Attorney, Agent, or Firm* — Burr & Forman

(57) ABSTRACT

A robotic work tool system comprising a robotic work tool (100) arranged to operate in an operational area (205), the robotic work tool system comprising controller (110, 240A) being configured to receive (410) a map of the operational area, receive (420) a first temporary boundary (220-1-4), receive (430) a second temporary boundary (220-1-4), and generate (440) a composite boundary (220C) encompassing the first and the second temporary boundaries (220-1-4), wherein the composite boundary (220C) is the boundary (220) for the robotic work tool (100) when operating in the operational area (205).

19 Claims, 6 Drawing Sheets

(56)  References Cited

U.S. PATENT DOCUMENTS

| | | | |
|---|---|---|---|
| 2016/0274579 A1* | 9/2016 | So | G05D 1/686 |
| 2017/0120445 A1* | 5/2017 | Reigo | G05D 1/0219 |
| 2018/0255704 A1* | 9/2018 | Kamfors | A01D 34/008 |
| 2019/0061157 A1* | 2/2019 | Suvarna | G05D 1/0274 |
| 2020/0196107 A1* | 6/2020 | Pegg | G08B 21/0225 |
| 2021/0112708 A1* | 4/2021 | Kameyama | G05D 1/0088 |
| 2021/0156704 A1* | 5/2021 | Gibson | G01C 21/3848 |
| 2021/0188297 A1* | 6/2021 | Wray | B60W 50/0098 |
| 2021/0191422 A1* | 6/2021 | Knuth, Jr. | G05D 1/244 |
| 2021/0274705 A1 | 9/2021 | Mårtensson et al. | |
| 2022/0124973 A1* | 4/2022 | Juel | A01D 34/008 |
| 2024/0049627 A1* | 2/2024 | Tengblad | G05D 1/0297 |

FOREIGN PATENT DOCUMENTS

| | | | | |
|---|---|---|---|---|
| WO | WO-2020143972 A1 * | 7/2020 | | G05D 1/617 |
| WO | WO-2020256619 A1 * | 12/2020 | | A01D 34/008 |
| WO | 2022124966 A1 | 6/2022 | | |

* cited by examiner

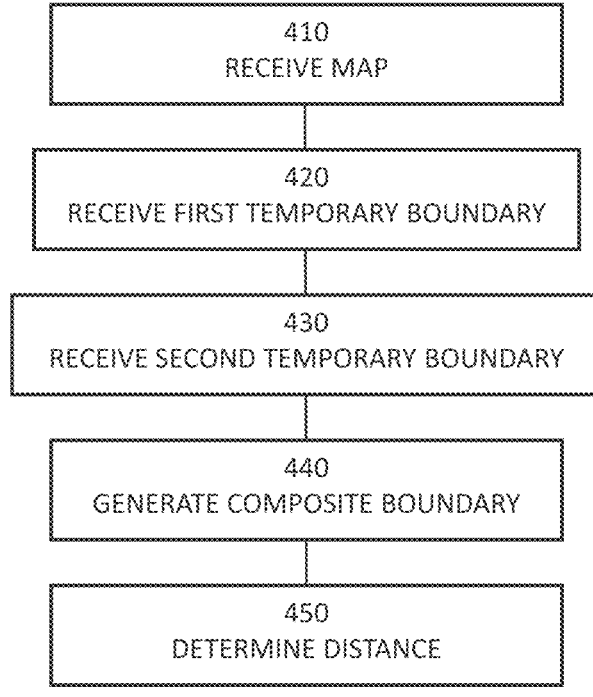

```
┌─────────────────────────────────────┐
│                 410                   │
│             RECEIVE MAP               │
└─────────────────────────────────────┘
                    │
┌─────────────────────────────────────┐
│                 420                   │
│   RECEIVE FIRST TEMPORARY BOUNDARY    │
└─────────────────────────────────────┘
                    │
┌─────────────────────────────────────┐
│                 430                   │
│   RECEIVE SECOND TEMPORARY BOUNDARY   │
└─────────────────────────────────────┘
                    │
┌─────────────────────────────────────┐
│                 440                   │
│      GENERATE COMPOSITE BOUNDARY      │
└─────────────────────────────────────┘
                    │
┌─────────────────────────────────────┐
│                 450                   │
│          DETERMINE DISTANCE           │
└─────────────────────────────────────┘
```

FIG. 4

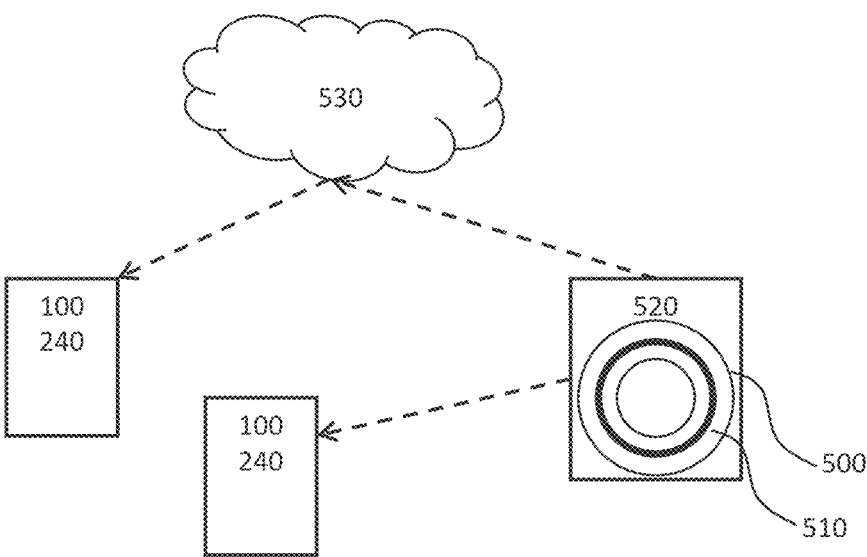

FIG. 5

DEFINITION OF BOUNDARY FOR A ROBOTIC WORK TOOL

TECHNICAL FIELD

This application relates to a robotic work tool, such as a lawnmower, and a method for providing an improved definition of a boundary for an operational area for the robotic work tool.

BACKGROUND

Automated or robotic work tools such as robotic lawnmowers are becoming increasingly more popular and so is the use of the robotic work tool in various types of operational areas.

Such operational areas, in particular for robotic work tools being robotic lawnmowers, often include irregular surfaces and boundaries as well as several features, such as houses, trees, flower beds and so on. The operational areas may also comprise one or more work areas that are connected by transport paths.

As such, the traditional manners of defining a boundary is becoming more and more complicated and time-consuming. In order to reduce the time needed more and more advanced technologies are employed, which may be difficult for the average user to familiarize with, especially since the technical tools are only used at the installation phase of a robotic work tool 100.

Thus, there is a need for an improved manner of providing a simplified definition of a boundary for an operational area for a robotic work tool 100 system.

SUMMARY

It is therefore an object of the teachings of this application to overcome or at least reduce those problems by providing a method for use in a robotic work tool system comprising a robotic work tool arranged to operate in an operational area, the operational area being bounded by a boundary, wherein the method comprises: receiving a map of the operational area, receiving a first temporary boundary, receiving a second temporary boundary, and generating a composite boundary encompassing the first and the second temporary boundaries, wherein the composite boundary is the boundary for the robotic work tool when operating in the operational area.

In one embodiment the method further comprises receiving the first and second temporary boundary by receiving user input defining the first temporary boundary and receiving user input defining the second temporary boundary.

In one embodiment the method further comprises receiving the user input by displaying a representation of the map of the operational area and the user input is received relative the displayed map.

In one embodiment the method further comprises receiving the user input for a temporary boundary as a drawing of at least a segment of the temporary boundary.

In one embodiment the method further comprises connecting drawn segments.

In one embodiment the method further comprises receiving the user input for a temporary boundary as an indication of a corner for at least a segment of the temporary boundary.

In one embodiment the method further comprises connecting corners.

In one embodiment the method further comprises wherein the method further comprises connecting drawn segments and corners.

In one embodiment the first temporary boundary is of a type indicating a use, wherein the use indicates a work area, a transport path or a stay-out area.

In one embodiment the first temporary boundary is of a same type as the second temporary boundary.

In one embodiment the first temporary boundary is of a different type than the second temporary boundary.

In one embodiment the method further comprises generating the composite boundary at one or more safety distances from the first and second temporary boundaries.

In one embodiment a first of the one or more safety distances relating to the first temporary boundary is the same as a second of the one or more safety distances relating to the second temporary boundary.

In one embodiment a first of the one or more safety distances relating to the first temporary boundary is different to a second of the one or more safety distances relating to the second temporary boundary.

In one embodiment the method comprises determining at least one of the one or more distances based on one or more capabilities of the robotic work tool.

In one embodiment the capabilities relate to the size of the robotic work tool.

In one embodiment the capabilities relate to the size of a work tool of the robotic work tool.

In one embodiment the capabilities relate to a speed of the robotic work tool.

In one embodiment the capabilities relate to a capability to detect obstacles of the robotic work tool.

In one embodiment the method further comprises determining at least one of the one or more distances based on a terrain, a topology or a condition of the topology of the operational area.

In one embodiment the method further comprises determining at least one of the one or more distances as an absolute distance.

In one embodiment the method comprises determining at least one of the one or more distances as a relative distance.

In one embodiment the method comprises determining at least one of the one or more distances based on user input.

In one embodiment the robotic work tool is a robotic lawnmower.

It is also an object of the teachings of this application to overcome the problems by providing a computer-readable medium carrying computer instructions that when loaded into and executed by a controller of a robotic work tool enables the robotic work tool to implement the method according to herein.

It is also an object of the teachings of this application to overcome the problems by providing a computer-readable medium carrying computer instructions that when loaded into and executed by a controller of a server enables the server to implement the method according to herein.

It is also an object of the teachings of this application to overcome the problems by providing a robotic work tool system comprising a robotic work tool arranged to operate in an operational area, the robotic work tool system comprising controller being configured to receive a map of the operational area, receive a first temporary boundary, receive a second temporary boundary, and generate a composite boundary encompassing the first and the second temporary boundaries, wherein the composite boundary is the boundary for the robotic work tool when operating in the operational area.

In one embodiment the robotic work tool comprises the controller.

In one embodiment the robotic work tool system further comprises a server, wherein the server comprises the controller.

Further embodiments and aspects are as in the attached patent claims and as discussed in the detailed description.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which:

FIG. 4 shows a corresponding flowchart for a method according to some example embodiments of the teachings herein; and FIG. 5 shows a schematic view of a computer-readable medium carrying computer instructions that when loaded into and executed by a controller of a robotic work tool, enables the robotic work tool to implement the teachings herein.

DETAILED DESCRIPTION

Figure 1:
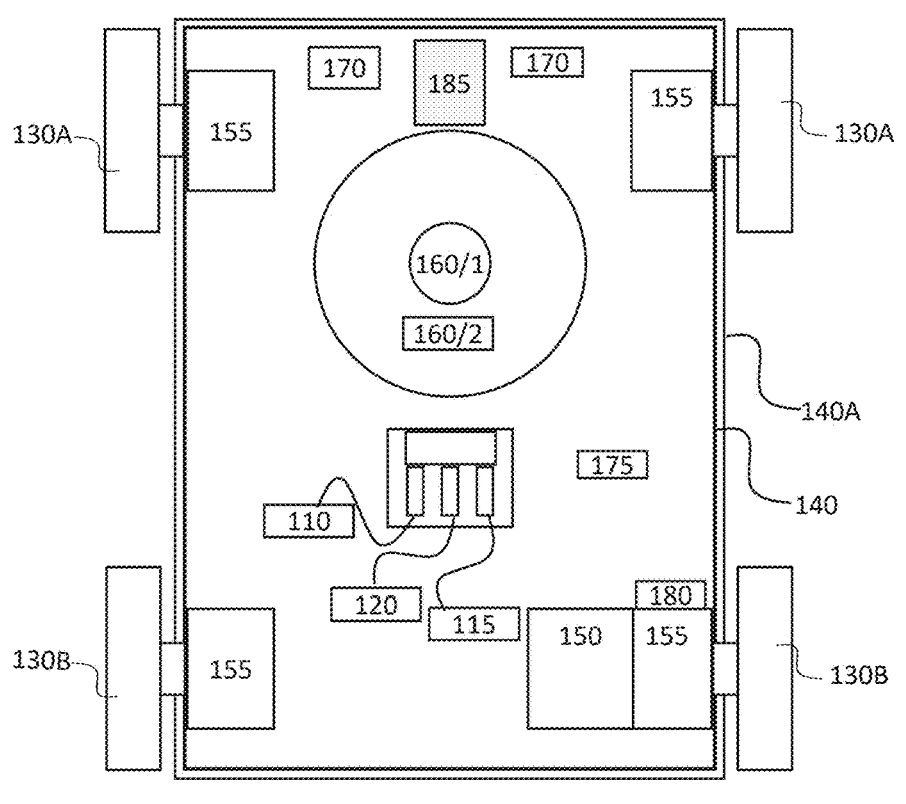
FIG. 1 shows a schematic view of the components of an example of a robotic work tool being a robotic lawnmower according to some example embodiments of the teachings herein.

The disclosed embodiments will now be described more fully hereinafter with reference to the accompanying drawings, in which certain embodiments of the invention are shown. This invention may, however, be embodied in many different forms and should not be construed as limited to the embodiments set forth herein. Like reference numbers refer to like elements throughout.

It should be noted that even though the description given herein will be focused on robotic lawnmowers, the teachings herein may also be applied to robotic watering tools, robotic golf ball collectors, robotic mulchers, and robotic grinders to mention a few examples.

FIG. 1A shows a schematic overview of a robotic work tool 100, here exemplified by a robotic lawnmower 100. The robotic work tool 100 may be a multi-chassis type or a mono-chassis type (as in FIG. 1A). A multi-chassis type comprises more than one main body parts that are movable with respect to one another. A mono-chassis type comprises only one main body part.

It should be noted that robotic lawnmower may be of different sizes, where the size ranges from merely a few decimetres for small garden robots, to even more than 1 meter for large robots arranged to service for example airfields.

In some embodiments, and as will be discussed below, the robotic work tool is a semi-controlled or at least supervised autonomous work tool, such as farming equipment or large lawnmowers, for example riders or comprising tractors being autonomously controlled.

It should also be noted that the robotic work tool is a self-propelled robotic work tool, capable of autonomous navigation within an operational area, where the robotic work tool propels itself across or around the operational area in a pattern (random or predetermined).

The robotic work tool 100, exemplified as a robotic lawnmower 100, has a main body part 140, possibly comprising a chassis 140 and an outer shell 140A, and a plurality of wheels 130 (in this example four wheels 130, but other number of wheels are also possible, such as three or six).

The main body part 140 substantially houses all components of the robotic lawnmower 100. At least some of the wheels 130 are drivably connected to at least one electric motor 155 powered by a battery 150. It should be noted that even if the description herein is focused on electric motors, combustion engines may alternatively be used, possibly in combination with an electric motor. In the example of FIG. 1, each of the wheels 130 is connected to a common or to a respective electric motor 155 for driving the wheels 130 to navigate the robotic lawnmower 100 in different manners. The wheels, the motor 155 and possibly the battery 150 are thus examples of components making up a propulsion device. By controlling the motors 155, the propulsion device may be controlled to propel the robotic lawnmower 100 in a desired manner, and the propulsion device will therefore be seen as synonymous with the motor(s) 150. It should be noted that wheels 130 driven by electric motors is only one example of a propulsion system and other variants are possible such as caterpillar tracks.

The robotic lawnmower 100 also comprises a controller 110 and a computer readable storage medium or memory 120. The controller 110 may be implemented using instructions that enable hardware functionality, for example, by using executable computer program instructions in a general-purpose or special-purpose processor that may be stored on the memory 120 to be executed by such a processor. The controller 110 is configured to read instructions from the memory 120 and execute these instructions to control the operation of the robotic lawnmower 100 including, but not being limited to, the propulsion and navigation of the robotic lawnmower.

The controller 110 in combination with the electric motor 155 and the wheels 130 forms the base of a navigation system (possibly comprising further components) for the robotic lawnmower, enabling it to be self-propelled as discussed.

The controller 110 may be implemented using any suitable, available processor or Programmable Logic Circuit (PLC). The memory 120 may be implemented using any commonly known technology for computer-readable memories such as ROM, FLASH, DDR, or some other memory technology.

The robotic lawnmower 100 is further arranged with a wireless communication interface 115 for communicating with other devices, such as a server, a personal computer, a smartphone, the charging station, and/or other robotic work tools. Examples of such wireless communication devices are Bluetooth®, WiFi® (IEEE802.11b), Global System Mobile (GSM) and LTE (Long Term Evolution), to name a few. The robotic lawnmower 100 may be arranged to communicate with a user equipment (not shown but will be regarded as being an example of a server, as an example of a connected device) as discussed in relation to FIG. 2 below for providing information regarding status, location, and progress of operation to the user equipment as well as receiving commands or settings from the user equipment. Alternatively or additionally, the robotic lawnmower 100 may be arranged to communicate with a server (referenced 240 in FIG. 2) for providing information regarding status, location, and progress of operation as well as receiving commands or settings.

The robotic lawnmower 100 also comprises a work tool 160, which in the example of the robotic lawnmower 100 is a grass cutting device 160, such as a rotating blade 160/2 driven by a cutter motor 160/1. In embodiments where the robotic work tool 100 is exemplified as an automatic grinder, the work tool 160 is a rotating grinding disc.

The robotic lawnmower 100 comprises a satellite signal navigation sensor 175 configured to provide navigational information (such as position) based on receiving one or more signals from a satellite—possibly in combination with receiving a signal from a base station. In some embodiments the satellite navigation sensor is a GPS (Global Positioning System) device or other Global Navigation Satellite System (GNSS) device. In some embodiments the satellite navigation sensor 175 is a RTK sensor. This enables the robotic work tool to operate in an operational area bounded by a virtual border (referenced 220 in FIG. 2).

In some embodiments, the robotic lawnmower 100 also comprises deduced reckoning sensors 180. The deduced reckoning sensors may be odometers, accelerometers or other deduced reckoning sensors. In some embodiments, the robotic work tool comprises a visual odometery sensor 180, possibly comprised in or connected to the other deduced reckoning sensors 180.

In some embodiments, the deduced reckoning sensors are comprised in the propulsion device, wherein a deduced reckoning navigation may be provided by knowing the current supplied to a motor and the time the current is supplied, which will give an indication of the speed and thereby distance for the corresponding wheel.

The deduced reckoning sensors 180, especially in combination with the visual odometry sensor, enables the root to operate according to a map of the operational area. In some such embodiments, the navigation is based on SLAM, and in some embodiments, where a visual odometry sensor (such as a camera) is utilized, the navigation is based on V-SLAM.

For enabling the robotic lawnmower 100 to navigate with reference to a wire, such as a boundary wire or a guide wire, emitting a magnetic field caused by a control signal transmitted through the wire, the robotic lawnmower 100 is, in some embodiments, configured to have at least one magnetic field sensor 170 arranged to detect the magnetic field and for detecting the wire and/or for receiving (and possibly also sending) information to/from a signal generator. In some embodiments, such a magnetic boundary is used to provide a border (not shown explicitly in FIG. 2, but deemed to be included in the boundary 220) enclosing an operational area (referenced 205 in FIG. 2).

The robotic lawnmower 100 is in some embodiments arranged to operate according to a map application (indicated in FIG. 2 and referenced 120A) representing one or more operational area(s) possibly including one or more work areas 205-1, 205-2 and possibly transport paths 205TP between these work areas 205-1, 205-2 (and possibly the surroundings of the operational area(s)) as well as features of the operational area(s) stored in the memory 120 of the robotic lawnmower 100. In some embodiments, the map is also or alternatively stored in the memory of a server (referenced 240 in FIG. 2).

In some embodiments, the map may be generated or supplemented as the robotic lawnmower 100 operates or otherwise moves around in the operational area 205.

In some embodiments, the map may be generated or supplemented in an application (or other software) executed in the server 240. In some such embodiments the map is generated based on information received from the robotic work tool 100. In some embodiments the map is generated based on information received from a user, such as the user drawing the map in a drawing interface. In some embodiments the map is generated based on map information received from another application such as from an internet service. In one such embodiment the map is based on satellite map data. IN some embodiments, the map is based on map information that is supplemented by the user in a drawing or other application interface.

As a skilled person would understand, the map may be generated in a number of manners and the exact creation of the map is not at the core of the teachings herein and will thus not be exemplified further.

In some such embodiments, the map application is downloaded, possibly from the server. And, in some embodiments the map is generated by the robotic work tool 100 and stored in the memory of the robotic work tool 100, whereby supplementing features especially as regards the boundary are downloaded possibly from the server.

In some embodiments the robotic work tool is arranged or configured to traverse and operate in operational areas that are not essentially flat, but contain terrain that is of varying altitude, such as undulating, comprising hills or slopes or such. The ground of such terrain is not flat and it is not straightforward how to determine an angle between a sensor mounted on the robotic work tool and the ground. The robotic work tool is also or alternatively arranged or configured to traverse and operate in an operational area that contains obstacles that are not easily discerned from the ground. Examples of such are grass or moss-covered rocks, roots or other obstacles that are close to ground and of a similar colour or texture as the ground. The robotic work tool is also or alternatively arranged or configured to traverse and operate in an operational area that contains obstacles that are overhanging, i.e. obstacles that may not be detectable from the ground up, such as low hanging branches of trees or bushes. Such a garden is thus not simply a flat lawn to be mowed or similar, but an operational area of unpredictable structure and characteristics. The operational area exemplified with referenced to FIG. 2, may thus be such a non-uniform operational area as disclosed in this paragraph that the robotic work tool is arranged to traverse and/or operate in.

Figure 2:
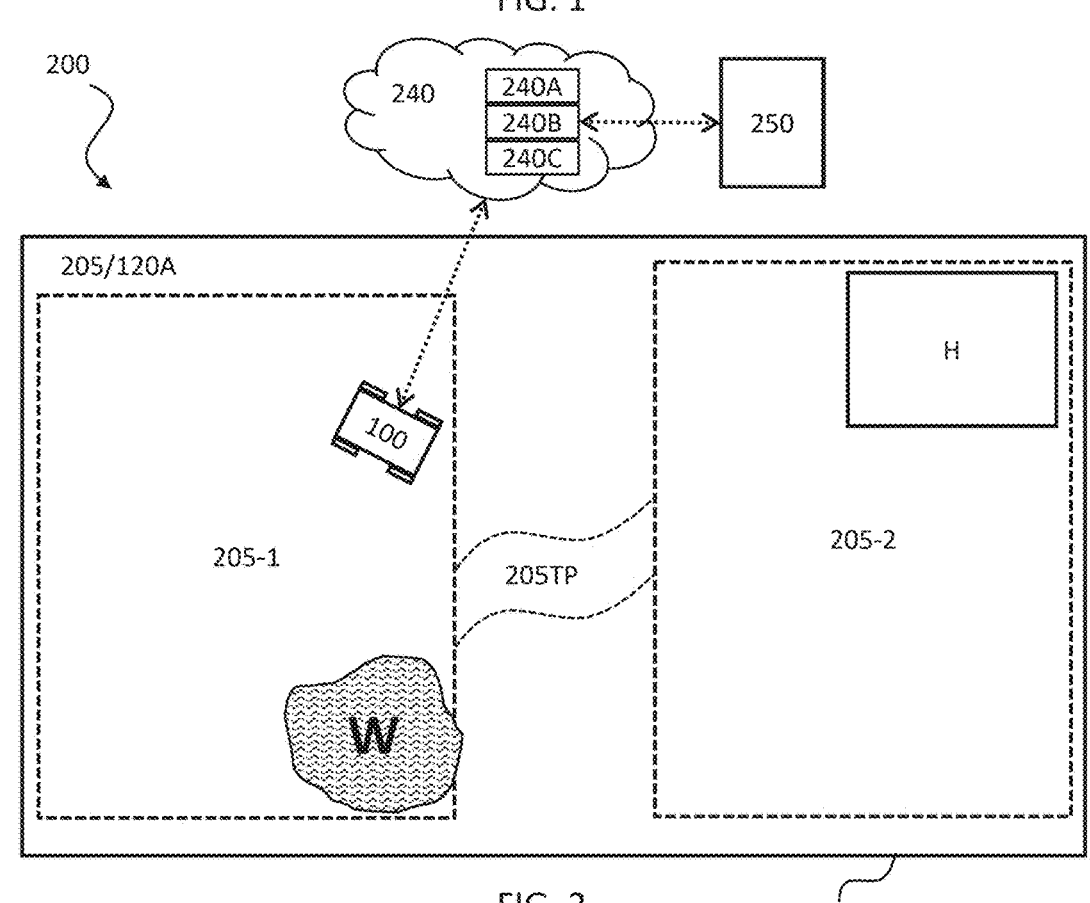
FIG. 2 shows a schematic view of a robotic work tool system according to some example embodiments of the teachings herein.

FIG. 2 shows a robotic work tool system 200 in some embodiments. The schematic view is not to scale. The robotic work tool system 200 comprises one or more robotic work tools 100 according to the teachings herein arranged to operate in one or more operational areas 205 bounded by a boundary 220. It should be noted that the operational area 205 shown in FIG. 2 is simplified for illustrative purposes.

The view of the operational area 205 is also intended to be an illustration or graphical representation of the map application 120A discussed in the above.

A server 240 is shown as an optional connected device for the robotic work tool 100 to communicate with—possibly for receiving maps or map updates. The server 240 comprises a controller 240A for controlling the operation of the server 240, a memory 240B for storing instructions and data relating to the operation of the server 240 and a communication interface 240C for enabling the server 240 to communicate with other devices, such as other servers and/or the robotic work tool(s) 100, and/or a User Equipment such as a mobile phone, tablet computer or other personal computer. In some embodiment the server is connected to a User Equipment, and in some embodiments, the server is comprised in a User Equipment. The controller, the memory and the communication interface may be of similar types as discussed in relation to FIG. 1 for the robotic work tool 100. In some embodiments, the server 240 is comprised in the robotic work tool 100.

The server 240 thus represents (as in being able to execute) an application for defining boundaries for a robotic work tool 100 system 200.

The server 240 is configured to display an application interface, either on a display connected to the server 240, such as a display 250 (see FIG. 3A) of a User Equipment or a display of the robotic work tool 100.

As with FIG. 1, the robotic work tool(s) 100 is exemplified by a robotic lawnmower, whereby the robotic work tool system 200 may be a robotic lawnmower system or a system comprising a combinations of robotic work tools, one being a robotic lawnmower, but the teachings herein may also be applied to other robotic work tools adapted to operate within an operational area.

As is shown in FIG. 2 there may be obstacles such as houses, structures, trees to mention a few examples in the operational area 205. In FIG. 2 such obstacles are indicated and referenced H (as in house) and W (as in water).

As discussed in relation to FIG. 1, the operational area is bonded by a boundary 220. The boundary 220 may be a physical (or magnetic) boundary or a virtual boundary or a combination of the two. In any case, for the robotic work tool 100 to be able to operate efficiently and according to modern requirements, the boundary 220 will comprise several (sub-) boundaries for various work areas 205-1, 205-2, transport paths 205TP as well as stay out (or forbidden) areas. In the example of FIG. 2, the body of water may be in one such forbidden area. And it is these (sub-) boundaries that are especially difficult for a user to define.

Figure 3A:
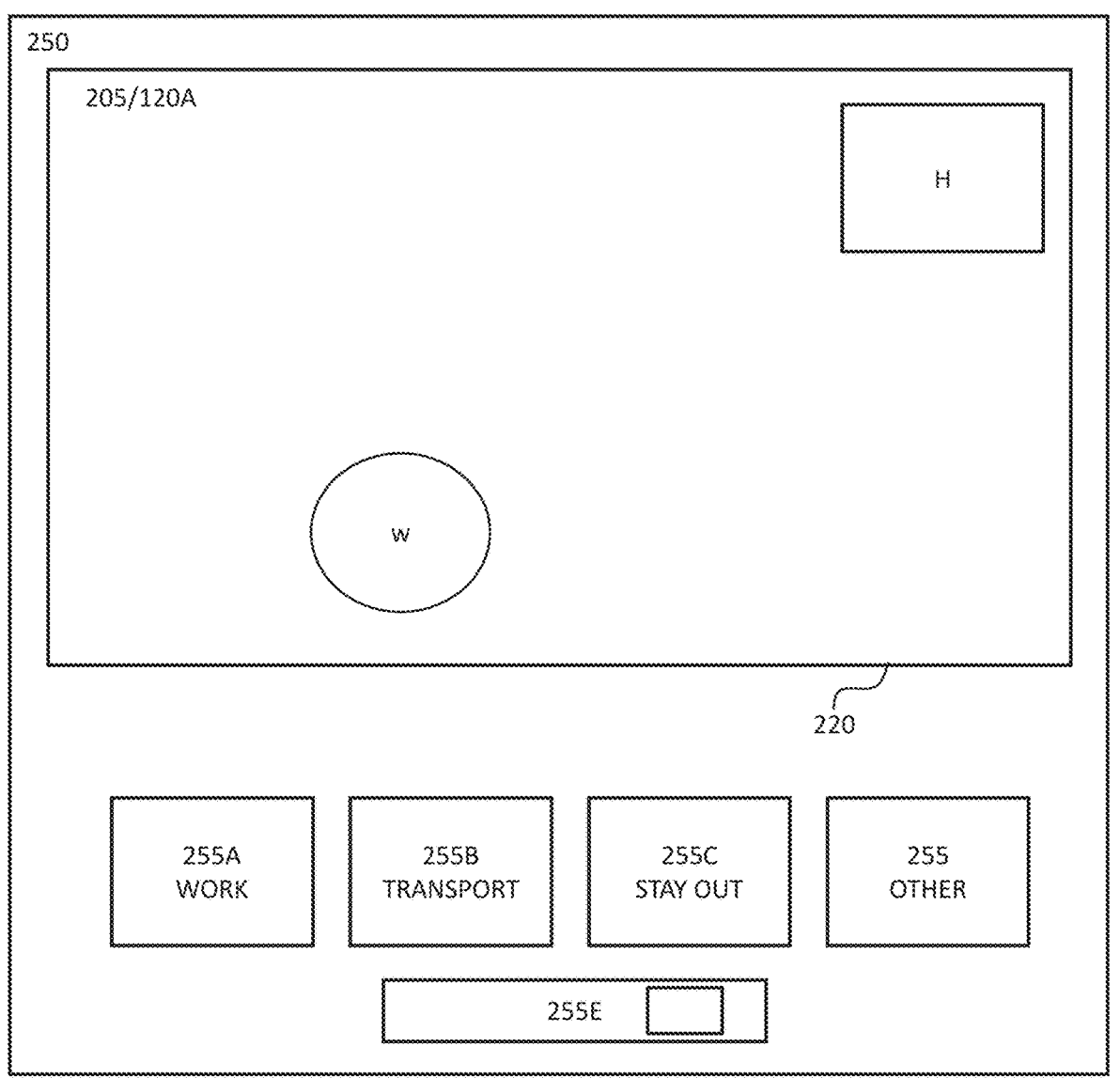
FIGS. 3A, 3B, 3C and 3D each shows a schematic view of a display in a robotic work tool system according to some example embodiments of the teachings herein.

FIG. 3A shows a schematic view of a display 250 showing one example of an application interface, wherein a graphical representation of the map 120A of the operational area 205 is displayed. In the following there will be made no specific difference between a displayed graphical representation of an entity and the entity itself, as the difference would be apparent to a skilled reader as well as obvious from the context.

The display shows the main boundary 220—if any—such as a magnetic boundary or a safety boundary encompassing the whole operational area 205. It should be noted that depending on the design of the robotic work tool 100 and local safety requirements, such main border may be optional.

The display 250 also shows the features (or rather the location(s) of the features) of the operational area 205, in this example the house H and the body of water W.

In this example one or more interface controls 255 are shown for enabling a user to input a rudimentary border, possibly of different types. In this example for controls are shown; one for inputting a work area boundary 255A, one for inputting a transport area boundary 255B, one for inputting a forbidden (or stay out) area boundary 255C and one for inputting other features or boundaries 255D. It should be noted that these controls, the number of controls, the associated functions are only examples and many variations exist, and the example shown is mainly for illustrative purposes. The controls may be touch-based virtual control in the case the display 250 is a touch display. The controls may be non-touch-based, such as using a mouse or other cursor controlling device, regardless whether the display 250 a touch display or not.

Figure 3B:
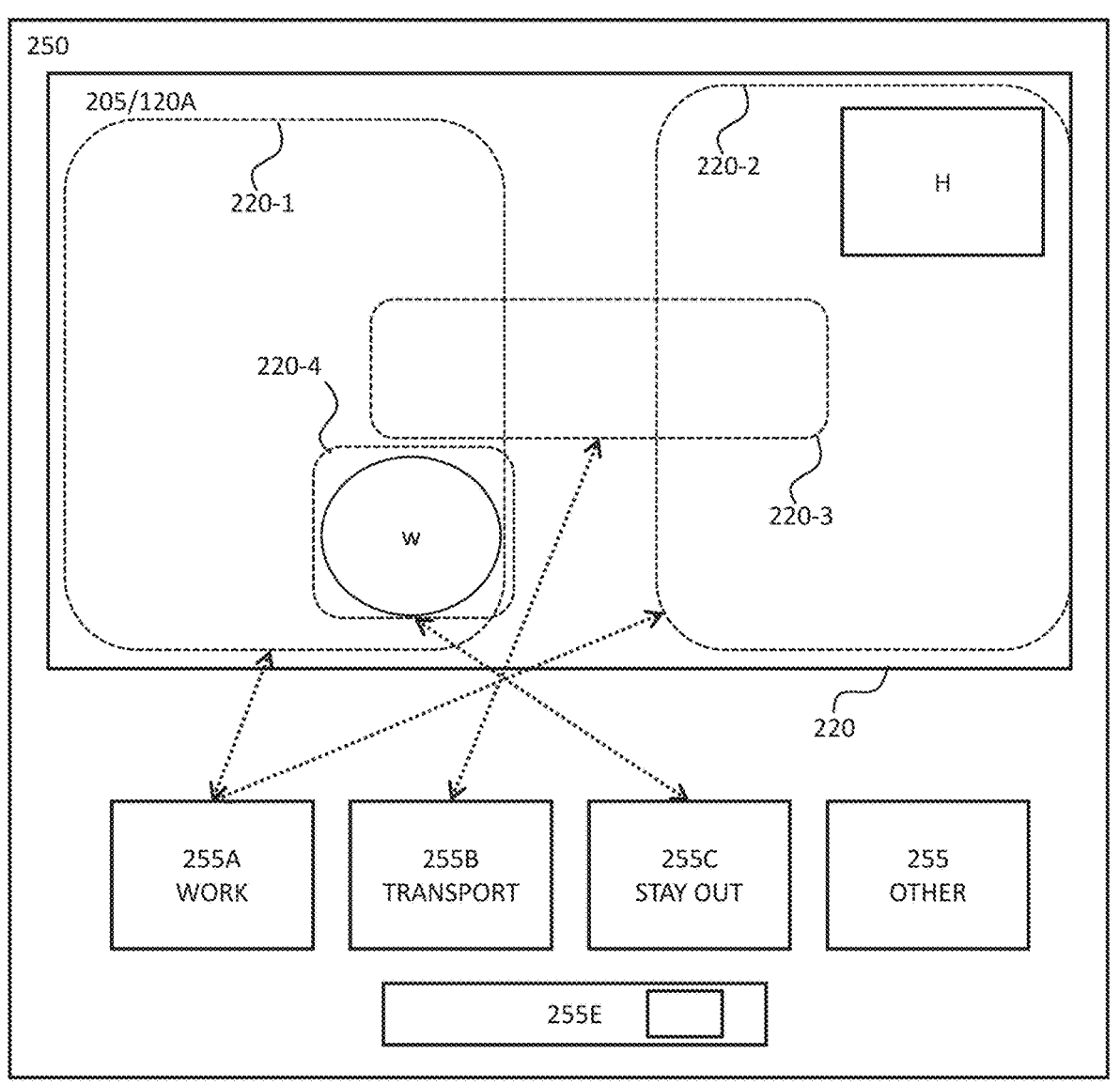

FIG. 3B shows an example where one or more (in this example four (4)) temporary boundaries have been defined roughly in the display view 250. Two boundaries 220-1, 220-2 have been defined for defining two work areas 205-1, 205-2. One boundary 220-3 has been defined for defining a transport path. And one boundary 220-4 has been defined for defining a stay out zone. In this example it is shown how the various controls have been utilized to define the boundaries. In one example a boundary can be defined by simply selecting what type of boundary and drawing the boundary on the display. The selection of type may be done prior to drawing the boundary or after. In some embodiments the boundary is defined by drawing the boundary and in some embodiments the boundary is defined by indicating positions of corners which are then connected automatically. In some embodiments, a boundary may be defined by indicating positions of some corners and drawing some segments. In some embodiments, a boundary or segment thereof may be adjusted. The adjustment may be by indicating new corner points, by dragging the boundary in places where needed or by redrawing (segment(s) of) the boundary.

As the various (sub-) boundaries 220-1-4 have been input, a composite boundary 220C is generated automatically as a boundary encompassing all the boundaries. In some embodiments the composite boundary is generated as the union of the (sub-) boundaries. In some embodiments the composite boundary is generated as the envelope of the (sub-) boundaries.

The composite boundary is then used as the boundary 220 for operating in the operational area 205.

As would be understood, one composite boundary may be generated for one, some or all robotic work tools 100 in the robotic work tool system 200. Different robotic work tools 100 may thus operate according to different composite boundaries 220C which may all (or some) be generated in the simple manner discussed herein.

Figure 3C:
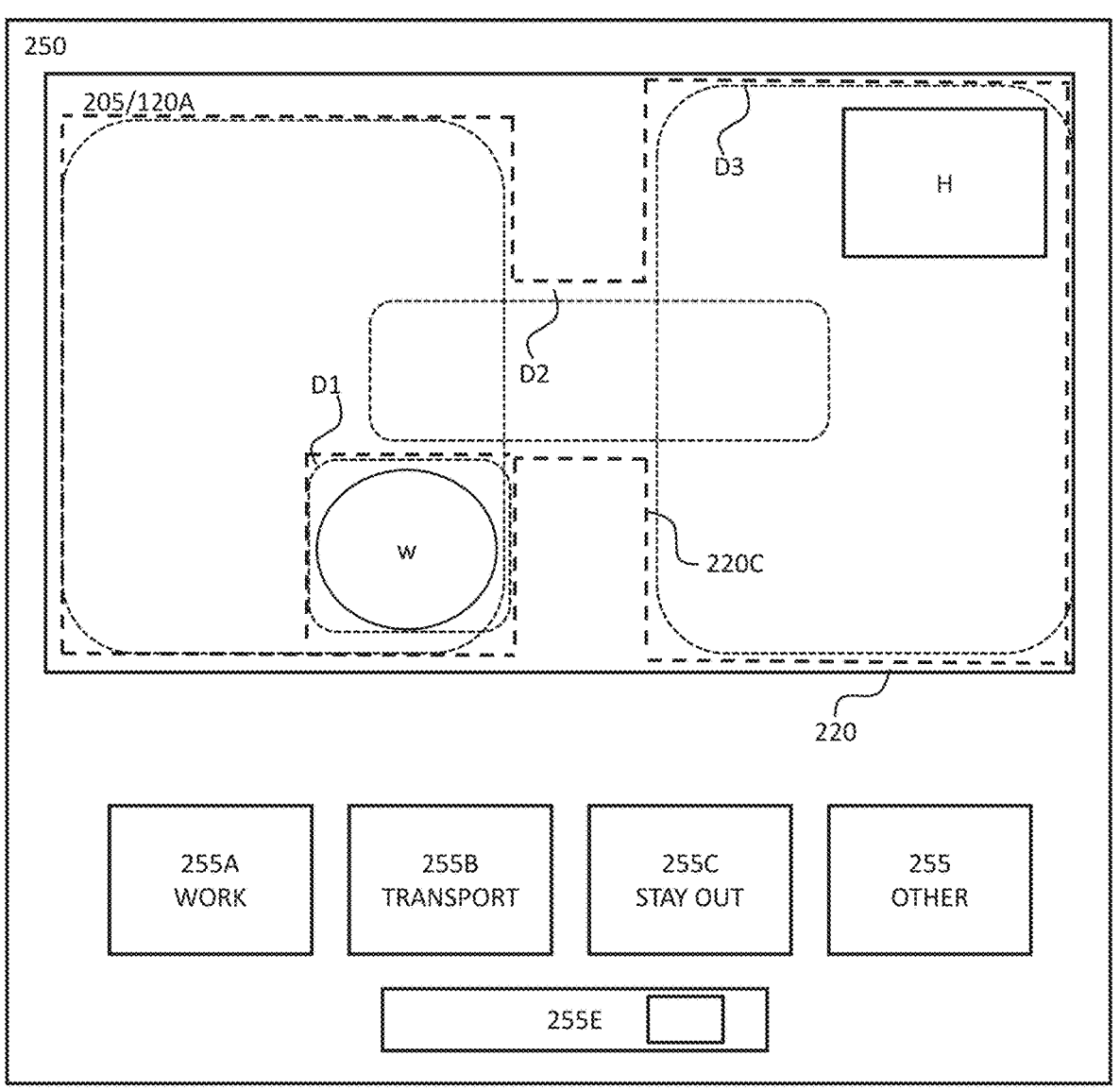
Figure 3D:
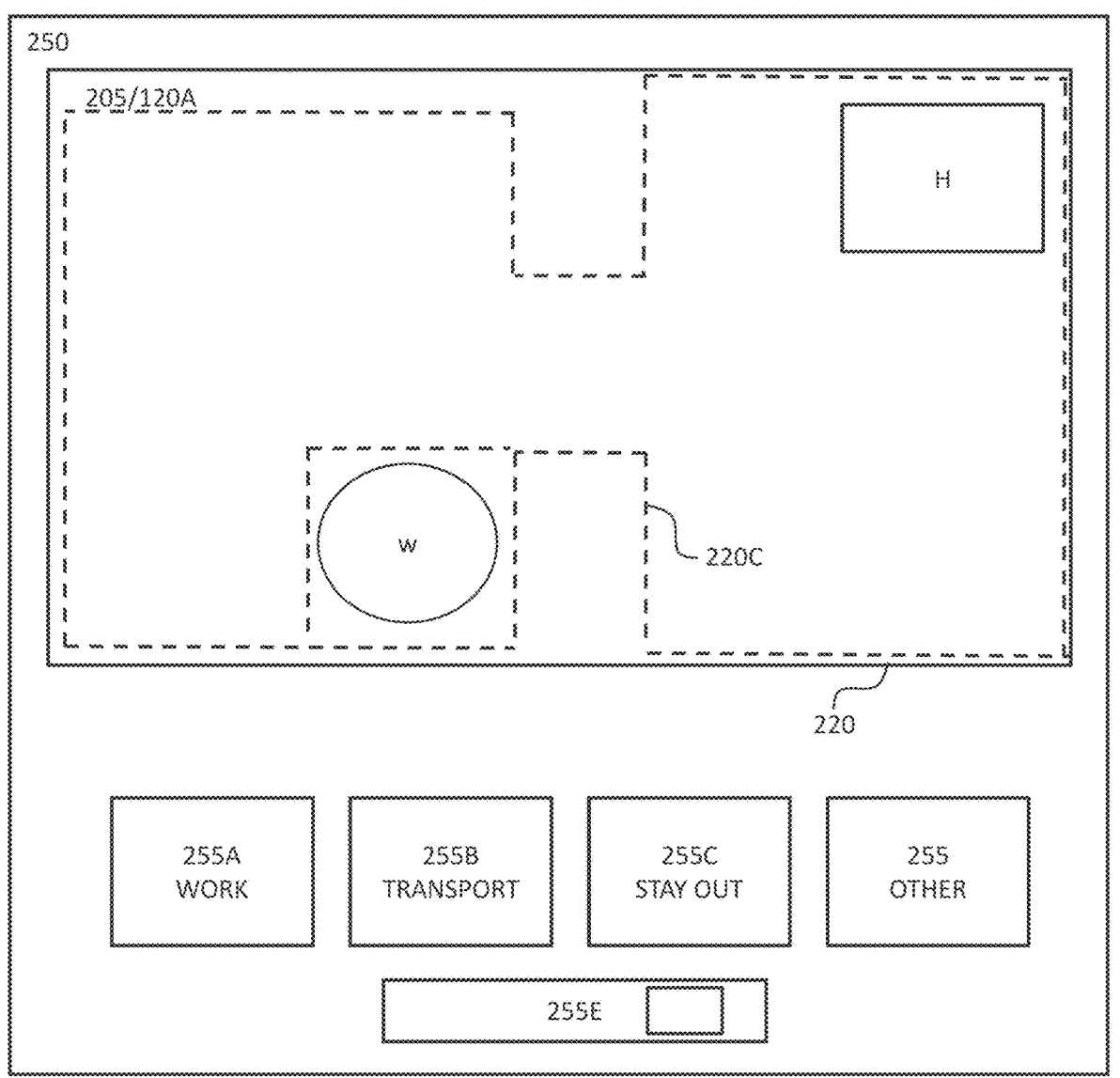

FIG. 3C shows an example of a composite boundary overlaid over the (sub-) boundaries. As can be seen the composite boundary 220C follows the (sub-) boundaries. In some embodiments, and as shown, the composite boundary is at a distance D from the enclosed boundary. This is to ensure that the composite boundary encloses all the boundaries. The distance may be positive—indicating a distance outside the (union of) the boundaries, as is shown in FIG. 3C. The distance may also be negative—indicating a distance outside the (union of) the boundaries. In some embodiments, the distance is different for different segments. In some embodiments, the distance is different for different types of boundaries as is indicated in FIG. 3C where one distance D1 is used for stay out boundaries, one distance D2 is used for transport paths and one distance D3 is used for work area boundaries.

In some alternative or additional embodiments a distance is determined as an absolute distance for example 0.25, 0.5, 0.75, 1, or 1.5 meters or any range there inbetween.

In some alternative or additional embodiments a distance is determined as a relative distance for example 1, 5 or 10 percent or any range there inbetween of the size of the enclosed area.

In some alternative or additional embodiments, the distance is set by a user (i.e. the distance is based on user input), for example through a user control such as a distance selector 255E. The distance may be selected prior to defining a boundary or afterwards. The distance may be selected for all boundaries at once, or for selected boundaries or even portions thereof.

For area (or site) centric operation the job to be done is more interesting than the individual robotic work tool 100. The basic idea is that the user of the system describes what work he/she wants to be done, where and to what quality. It is then the task for the controller to know the capabilities of the robotic work tool 100 and the terrain in the user-defined areas. To mitigate situations where the robotic work tool 100 may get stuck or may navigate into areas where it is not supposed to be, the operational area should be limited or adapted. This is especially important for robotic work tool 100 types which are lacking perception capability. There may also be differences in the interpretation of site objects which require adjustments to operating areas.

In some alternative or additional embodiments, the distance is therefore determined based on capabilities of the robotic work tool 100. In such embodiments, the capabilities are received and the distance(s) is determined based on the capabilities.

In some alternative or additional embodiments the capabilities relate to the size of the robotic work tool 100, wherein a larger robotic work tool 100 receives a longer distance. In some such embodiments, the distance is set to 10, 15, 20, 50, 100, 150 or 200 percent of the width or the length of the robotic work tool 100 or any range there-inbetween.

In some alternative or additional embodiments the capabilities relate to the size of the work tool 160, wherein a larger work tool receives a longer distance. In some such embodiments, the distance is set to 20, 50, 100, 150, 200 or 300 percent of the width of the work tool 160 or any range there-inbetween.

In some alternative or additional embodiments the capabilities relate to a speed of the robotic work tool 100, wherein a faster robotic work tool 100 receives a longer distance. In some such embodiments, the distance is set to the distance covered in 1, 5, or 10 seconds or any range there-inbetween.

In some alternative or additional embodiments, the distance is set based on a combination of capabilities. For example a small but fast robotic work tool 100 may receive a same or even higher distance as a large but slow robotic work tool 100.

In some alternative or additional embodiments, the distance is determined based on the terrain, the topology or conditions of the topology (risk for slipping). In some such embodiments, the distance is determined based on a slope of the area, wherein a steeper slope receive a longer distance. In some alternative or additional such embodiments, the distance is determined based on a risk of slipping in the area, wherein a higher risk of slipping receive a longer distance.

In some alternative or additional embodiments the capabilities relate to a capability to detect obstacles of the robotic work tool 100, wherein a higher capability to detect obstacles receives a shorter distance.

It should be noted that any processing may be done in any, some or all of the controller 110 of the robotic work tool 100 and/or the controller 240A of the server 240 and that the processing may also be done partially in one controller 110/240A for supplemental processing in the other controller 110/240A. This is indicated in FIG. 2 in that a dashed arrow is shown between the server 240 and the robotic work tool 100 for indicating that information may be passed freely between them for (partial) processing.

FIG. 4 shows a flowchart for a general method according to herein. The method is for use in a robotic work tool system as in FIG. 2 in a manner as discussed above in relation to FIGS. 3A, 3B, 3C, 3D, namely for use in a robotic work tool system comprising a robotic work tool 100 arranged to operate in an operational area 205, wherein the robotic work tool 100 system possibly comprises a server 240.

The method comprises a controller of the robotic work tool system 200, such as the controller for executing a boundary-defining application (referenced 510 in FIG. 5) as discussed in the above, receiving 410 a map of the operational area 205 and receiving 420 a first temporary boundary 220-1-4 and receiving 430 a second temporary boundary 220-1-4. In some embodiments the user input for defining the temporary border is received in the server 240, whereby the computation of the composite boundary is performed in the robotic work tool 100, the robotic work tool 100 thus receiving the temporary boundary after the server 240 has received the user input for defining the temporary boundary. The method also comprises generating 440 a composite boundary 220C encompassing the first and the second temporary boundaries 220-1-4, wherein the composite boundary 220C is the boundary 220 the robotic work tool 100 operating in the operational area 205.

As discussed herein and assumed under FIG. 4, the determinations are made by the server 240 and in such embodiments the controller is the controller 240A of the server 240.

In some embodiments, and as also discussed in the above, some processing may be done by the robotic work tool 100. In such embodiments the controller is the controller 110 of the robotic work tool 100.

And, in some embodiments the controller is the controller 110 of the robotic work tool 100 for performing some of the processing and the controller 240A of the server 240 for performing some of the processing for a shared processing, where some tasks are performed by one controller, and the remaining tasks by the other controller.

FIG. 5 shows a schematic view of a computer-readable medium 500 carrying computer instructions 510 that when loaded into and executed by a controller of a device, such as a robotic work tool 100 or a server 240, enables the device to implement the teachings herein. The computer-readable instructions thus include a boundary-defining application as discussed in the above. In the example of FIG. 5, the device will be exemplified as the robotic work tool 100. The computer-readable medium 500 may be tangible such as a hard drive or a flash memory, for example a USB memory stick or a cloud server. Alternatively, the computer-readable medium 500 may be intangible such as a signal carrying the computer instructions enabling the computer instructions to be downloaded through a network connection, such as an internet connection. In the example of FIG. 5, a computer-readable medium 500 is shown as being a hard drive or computer disc 500 carrying computer-readable computer instructions 510, being inserted in a computer disc reader 520. The computer disc reader 520 may be part of a cloud server 530—or other server—or the computer disc reader 520 may be connected to a cloud server 530—or other server. The cloud server 530 may be part of the internet or at least connected to the internet. The cloud server 530 may alternatively be connected through a proprietary or dedicated connection. In one example embodiment, the computer instructions are stored at a remote server 530 and be downloaded to the memory 120 of the robotic work tool 100 for being executed by the controller 110 or to the memory 240B of the server 240 to be executed by the controller 240A.

The computer disc reader 520 may also or alternatively be connected to (or possibly inserted into) a robotic work tool 100 or server 240 for transferring the computer-readable computer instructions 510 to a controller of the robotic work tool 100 or server 240 (presumably via a memory of the robotic work tool 100 or server 240).

FIG. 5 shows both the situation when a device, such as a robotic work tool 100 or a server 240, receives the computer-readable computer instructions 510 via a server connection and the situation when another device, such as a robotic work tool 100 or a server 240, receives the computer-readable computer instructions 510 through a wired interface. This enables for computer-readable computer instructions 510 being downloaded into a device, such as a robotic work tool 100 or a server 240, thereby enabling the device, such as a robotic work tool 100 or a server 240, to operate according to and implement the teachings as disclosed herein.

The invention claimed is:

1. A method for use in a robotic work tool system comprising a robotic work tool arranged to operate in an operational area, wherein the method comprises:
receiving a map defined by a graphical representation of the operational area,
receiving a first temporary boundary,
receiving a second temporary boundary, and
generating a composite boundary encompassing the first and the second temporary boundaries, wherein the composite boundary is a boundary for the robotic work tool when operating in the operational area,
wherein at least a portion of one of the first temporary boundary or the second temporary boundary is defined by user input as a drawing of the portion on a display at which the map is displayed.

2. The method according to claim 1, wherein the method further comprises receiving the first and second temporary boundary by receiving user input defining the first temporary boundary and receiving user input defining the second temporary boundary.

3. The method according to claim 2, wherein the method further comprises receiving the user input for a temporary boundary as a drawing of at least a segment of the temporary boundary.

4. The method according to claim 3, wherein the method further comprises connecting drawn segments.

5. The method according to claim 2, wherein the method further comprises receiving the user input for a temporary boundary as an indication of a corner for at least a segment of the temporary boundary.

6. The method according to claim 5, wherein the method further comprises connecting corners.

7. The method according to claim 4, wherein the method further comprises connecting drawn segments and corners.

8. The method according to claim 1, wherein the first temporary boundary is of a type indicating a use, wherein the use indicates a work area, a transport path or a stay-out area.

9. The method according to claim 8, wherein the first temporary boundary is of a same type or a different type as the second temporary boundary.

10. The method according to claim 1, wherein the method further comprises generating the composite boundary at one or more safety distances from the first and second temporary boundaries.

11. The method according to claim 10, wherein a first of the one or more safety distances relating to the first temporary boundary is the same as or different from a second of the one or more safety distances relating to the second temporary boundary.

12. The method according to claim 10, wherein the method comprises determining at least one of the one or more distances based on one or more capabilities of the robotic work tool.

13. The method according to claim 12, wherein the capabilities relate to the size of the robotic work tool, or a size of a work tool of the robotic work tool.

14. The method according to claim 12, wherein the capabilities relate to a speed of the robotic work tool.

15. The method according to claim 12, wherein the capabilities relate to a capability to detect obstacles of the robotic work tool.

16. The method according to claim 12, wherein the method further comprises determining at least one of the one or more distances: based on a terrain, a topology or a condition of the topology of the operational area, as an absolute distance, as a relative distance, or based on user input.

17. A computer-readable medium carrying computer instructions that when loaded into and executed by a controller of a robotic work tool or a server enables the robotic work tool or the server to implement the method according to claim 1, and
wherein the robotic work tool is a robotic lawnmower.

18. A robotic work tool system comprising a robotic work tool arranged to operate in an operational area, the robotic work tool system comprising controller being configured to
receive a map defined by a graphical representation of the operational area,
receive a first temporary boundary,
receive a second temporary boundary, and
generate a composite boundary encompassing the first and the second temporary boundaries, wherein the composite boundary is a boundary for the robotic work tool when operating in the operational area,
wherein at least a portion of one of the first temporary boundary or the second temporary boundary is defined by user input as a drawing of the portion on a display at which the map is displayed.

19. The robotic work tool system according to claim 18, wherein the robotic work tool or a server comprises the controller, and wherein the robotic work tool is a robotic lawnmower.

* * * * *